UNITED STATES PATENT OFFICE.

FREDERICK J. SEYBOLD, OF CHICAGO, ILLINOIS.

IMPROVEMENT IN COMPOSITIONS FOR COATING IRON AND OTHER METALS.

Specification forming part of Letters Patent No. 135,668, dated February 11, 1873.

*To all whom it may concern:*

Be it known that I, FREDERICK J. SEYBOLD, of the city of Chicago, county of Cook and State of Illinois, have invented a new and useful Improvement in Compounds for Coating Iron and other Metals, and Wood and other materials, to protect the same from deterioration and decay; and I do hereby declare that the following is a full, clear, and exact description thereof.

The nature of my invention consists in the making of a chemical compound that, applied to the surface of iron or other metals, wood or other materials, that are to be exposed to the air, earth, or water, will preserve such metals and materials from deterioration and decay.

My compound is composed of asphaltum or pine-tar, as the case suggests, sulphur, plumbago, carbonate of lime, and sand in about the following proportions: Two pounds of asphaltum or pine-tar, as the case may be, eight ounces of sulphur or brimstone, two ounces of plumbago, one ounce of carbonate of lime, and sand in any quantity desired. The asphaltum or pine-tar is melted, and the sulphur and plumbago also melted, and added and thoroughly mixed, and then the carbonate of lime added and all mixed, and the sand also added then, or added when the compound is melted to be used.

I am well aware that a patent was granted to Joseph A. Sewell, August 22, 1871, and numbered 118,397, for a compound composed of coal-tar, sulphur, plumbago, and carbonate of lime; and I do not wish to claim any of these in my invention; but simply wish to improve Joseph A. Sewell's compound by substituting asphaltum in the place of coal-tar when it is desired to ship the compound, as the compound, compounded with asphaltum instead of coal-tar, hardens so that it can be shipped in solid blocks or cakes, and wish to substitute pine-tar for either coal-tar or asphaltum in pine countries where pine-tar abounds, and is cheaper than coal-tar or asphaltum; and I wish to add sand in cases where it is desired to do so.

I wish specially to disclaim the coal-tar, sulphur, plumbago, and carbonate of lime, and only claim the substitution of asphaltum or pine-tar, and addition of sand when desired.

This compound may be applied by brush or otherwise to gas-pipes, water-pipes, sewer-pipes, metallic culverts, and sewerage, tunnels, or any other perishable substance or material to protect and preserve the same from corrosion and decay. It is adhesive and insoluble.

I do not confine myself to the precise proportions of the ingredients herein mentioned, as they may, perhaps, be varied, and still answer the same purpose.

Having thus fully described my invention, what I claim as new, and desire to secure by Letters Patent, is—

A compound formed of asphaltum or pine-tar, sulphur, plumbago, and carbonate of lime, with or without sand, and in about the proportions specified.

FREDERICK J. SEYBOLD.

Witnesses:
GEORGE S. BENTON,
LYMAN YOUNG.